Jan. 19, 1926.
F. MÜLLER
POWER TRANSMISSION CHAIN
Filed August 9, 1922
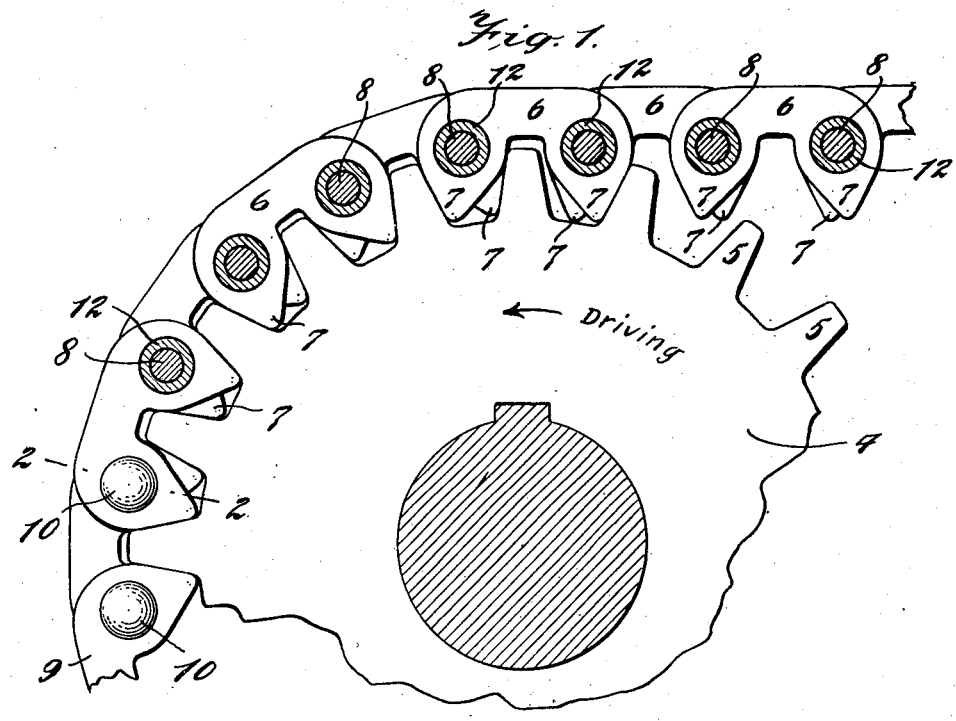
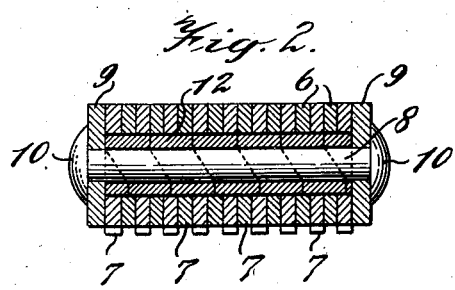 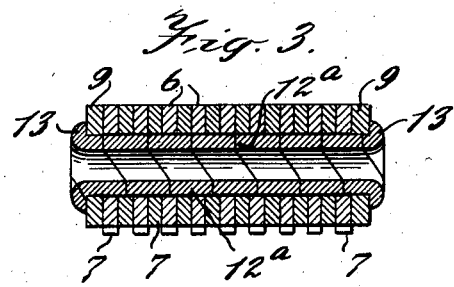
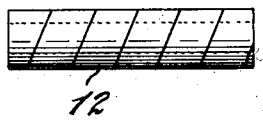
INVENTOR.
Friederich Müller
BY Gifford, Bull & Scull
his ATTORNEYS.

Patented Jan. 19, 1926.

1,570,272

UNITED STATES PATENT OFFICE.

FRIEDERICH MÜLLER, OF HARTFORD, CONNECTICUT, ASSIGNOR TO THE WHITNEY MFG. CO., OF HARTFORD, CONNECTICUT, A CORPORATION OF CONNECTICUT.

POWER-TRANSMISSION CHAIN.

Application filed August 9, 1922. Serial No. 580,709.

*To all whom it may concern:*

Be it known that I, FRIEDERICH MÜLLER, a citizen of the United States, residing at Hartford, in the county of Hartford and State of Connecticut, have invented certain new and useful Improvements in Power Transmission Chains, of which the following is a specification.

My invention relates to improvements in power transmission chains and particularly to that character or type of chain which embodies a plurality of overlapping links pivotally connected at their overlapping portions, the teeth on which are adapted to cooperate with teeth on driving and driven gears; and it consists of certain novel parts and combinations of parts particularly pointed out in the claims concluding these specifications.

The following is a description of my invention embodied in forms at present preferred by me, but it will be understood that various modifications and changes may be made therein without departing from the spirit of my invention and without exceeding the scope of my claims.

In the accompanying drawings, Figure 1 is an elevation, partly in section, of a gear and a chain embodying my invention; Fig. 2 is a section on the line 2—2, Fig. 1; Fig. 3 is a similar section of a modified form of the invention and Fig. 4 is an elevation of the bushing shown in Fig. 3.

Referring to the drawings, 4 is a gear, in this case assumed to be a driving gear moving in the direction shown by the arrow, which gear is provided with teeth 5, 5. The chain shown comprises a plurality of links 6, 6, each link being provided with teeth 7, 7, adapted to engage with the teeth on the gear. 8, 8 are pivots on which the links are mounted, as shown in elevation in Fig. 2. 9, 9, Fig. 2, are end plates and 10, 10 are heads on the pivot 8. The construction of the chain above described is well-known and need not be described more in detail. Indeed, my present invention is applicable to all chains of this general type and is not confined to the details here shown.

Referring to Figure 3, the links 7, 7 and the end pieces 9, 9 are mounted on a flexible member composed of a tubular helix of suitable metal, the ends of the heads being extended at 13, 13 over the outer faces of the end pieces, whereby the links are retained in place. This flexible member endows the chain with a certain amount of flexibility so that the teeth may more perfectly accommodate themselves to the teeth of the gear.

Figure 2 shows a modification where a central pin is employed with heads 10, 10 engaging with the end pieces 9, 9. In this embodiment of my invention, the flexible tubular member (shown in elevation in Figure 4) constitutes a bushing which is preferably adapted to freely rotate on the pin and on which the links are adapted to freely turn.

Besides, in the manufacture of a tubular bushing of considerable length by drilling it is very difficult to make it uniform and true with its aperture concentric to its periphery throughout its entire length, whereas a bushing made up of spirally wound metal may readily be made true with the aperture concentric with its periphery throughout its entire length.

What I claim and desire to secure by Letters Patent of the United States is:—

1. A power transmission chain comprising links arranged in overlapping relation and a flexible member in the form of a single flat helix on which said links are mounted.

2. A power transmission chain comprising links arranged in overlapping relation and a member on which the links are mounted and by which they are held together, said member being a single flat helix flexible in the longitudinal direction of the chain.

3. A power transmission chain comprising links arranged in overlapping relation and a flexible member in the form of a single flat helix on which said links are mounted and by which they are held together.

4. A power transmission chain comprising links arranged in overlapping relation and a flexible member in the form of a single flat helix on which said links are mounted, having expanded ends by which the links are held together.

FRIEDERICH MÜLLER.